United States Patent
Yamakawa et al.

(10) Patent No.: US 8,699,797 B2
(45) Date of Patent: Apr. 15, 2014

(54) IMAGE PROCESSING APPARATUS, IMAGE PROCESSING METHOD THEREOF, AND COMPUTER-READABLE STORAGE MEDIUM

(75) Inventors: Yuichi Yamakawa, Inzai (JP); Hiroichi Yamaguchi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 13/313,961

(22) Filed: Dec. 7, 2011

(65) Prior Publication Data

US 2012/0155772 A1 Jun. 21, 2012

(30) Foreign Application Priority Data

Dec. 15, 2010 (JP) .................................. 2010-279892

(51) Int. Cl.
*G06K 9/46* (2006.01)
(52) U.S. Cl.
USPC .......................................................... 382/190
(58) Field of Classification Search
USPC ......... 382/103, 115, 164, 173, 181, 190, 209, 382/217–222; 348/125, 129–130, 143, 149, 348/152–155, 169, 208.1
See application file for complete search history.

(56) References Cited

U.S. PATENT DOCUMENTS

| | | | |
|---|---|---|---|
| 5,436,672 A * | 7/1995 | Medioni et al. | 348/591 |
| 6,670,963 B2 * | 12/2003 | Osberger | 345/629 |
| 6,795,567 B1 | 9/2004 | Cham | |
| 8,238,605 B2 * | 8/2012 | Chien et al. | 382/103 |
| 2007/0146370 A1 | 6/2007 | Gordon | |
| 2009/0169067 A1 * | 7/2009 | Chang et al. | 382/118 |

FOREIGN PATENT DOCUMENTS

| | | |
|---|---|---|
| CN | 101651772 A | 2/2010 |
| JP | 2006-331108 A | 12/2006 |
| WO | 2004/038657 A | 5/2004 |

OTHER PUBLICATIONS

Kasutani E, et al, An Adaptive Feature Comparison Method for Real-Time Video Identification, IEEE, Sep. 14, 2003, vol. 2, pp. 5-8.

* cited by examiner

*Primary Examiner* — Jose Couso
(74) *Attorney, Agent, or Firm* — Canon USA, Inc., I.P. Division

(57) ABSTRACT

An image processing apparatus sequentially detects a feature in an image, sequentially acquires information of the detected feature, compares information of a previous feature detected in a previous frame of the image with information of a current feature detected in a current frame of the image to sequentially determine whether to estimate that the previous feature matches the current feature, and stops the determination to record the information of the feature detected in the previous frame as information of the feature detected in the current frame in a case where the number of previous features estimated to match the current feature is equal to or greater than a predetermined number.

16 Claims, 21 Drawing Sheets

MARKER 1
ID: A
CENTRAL COORDINATES: (7, 5)
SIZE: 32
THRESHOLD VALUE: 1

| SIZE | THRESHOLD VALUE |
|---|---|
| 40~ | 0 |
| 30~39 | 1 |
| 20~29 | 2 |
| 10~19 | 3 |

| MARKER 1<br>ID: A<br>CENTRAL COORDINATES: (7, 6)<br>SIZE: 20 | MARKER 2<br>ID: B<br>CENTRAL COORDINATES: (16, 5)<br>SIZE: 20 | MARKER 3<br>ID: C<br>CENTRAL COORDINATES: (26, 6)<br>SIZE: 20 |
|---|---|---|
| MARKER 4<br>ID: D<br>CENTRAL COORDINATES: (7, 14)<br>SIZE: 20 | MARKER 5<br>ID: E<br>CENTRAL COORDINATES: (16, 13)<br>SIZE: 20 | MARKER 6<br>ID: F<br>CENTRAL COORDINATES: (26, 14)<br>SIZE: 20 |

FIG.5

| | ID | B | A | C | E | D | F |
|---|---|---|---|---|---|---|---|
| LEFT-SIDE I-TH FRAME | CENTRAL COORDINATES | 16, 5 | 7, 6 | 26, 6 | 16, 13 | 7, 14 | 26, 14 |
| | SIZE | 20 | 20 | 20 | 20 | 20 | 20 |
| | THRESHOLD VALUE | 2 | 2 | 2 | 2 | 2 | 2 |

FIG.6A
CONTENTS RECORDED IN FEATURE HISTORY RECORDING UNIT

| | ID | B | A | C | E | D | F |
|---|---|---|---|---|---|---|---|
| LEFT-SIDE (I-1)TH FRAME | CENTRAL COORDINATES | 16, 5 | 7, 6 | 26, 5 | 16, 13 | 7, 14 | 16, 14 |
| | SIZE | 20 | 20 | 20 | 20 | 20 | 20 |
| | THRESHOLD VALUE | 2 | 2 | 2 | 2 | 2 | 2 |

FIG.6B
DETECTION RESULT OF CURRENT FRAME AND ITS DIFFERENCE FROM PREVIOUS FRAME
(AT THE TIME OF DETECTION OF THIRD MARKER)

| | ID | B | A | C |
|---|---|---|---|---|
| LEFT-SIDE I-TH FRAME | CENTRAL COORDINATES | 17, 6 | 8, 7 | 27, 6 |
| | SIZE | 20 | 20 | 20 |
| | THRESHOLD VALUE | 2 | 2 | 2 |

| DIFFERENCE | 1.4 | 1.4 | 1.4 |
|---|---|---|---|

FIG.6C
CONTENTS TRANSMITTED TO TRANSMISSION UNIT

| | ID | B | A | C | E | D | F |
|---|---|---|---|---|---|---|---|
| LEFT-SIDE I-TH FRAME | CENTRAL COORDINATES | 16, 5 | 7, 6 | 26, 5 | 16, 13 | 7, 14 | 16, 14 |
| | SIZE | 20 | 20 | 20 | 20 | 20 | 20 |
| | THRESHOLD VALUE | 2 | 2 | 2 | 2 | 2 | 2 |

| | ID | B | C | E |
|---|---|---|---|---|
| LEFT-SIDE I-TH FRAME | CENTRAL COORDINATES | 17, 6 | 27, 6 | 17, 14 |
| | SIZE | 20 | 20 | 20 |
| | THRESHOLD VALUE | 2 | 2 | 2 |

| | DIFFERENCE | 1.4 | 1.4 | 1.4 |
|---|---|---|---|---|

FIG.8A
CONTENTS RECORDED IN FEATURE HISTORY RECORDING UNIT

| | ID | B | A | C | E | D | F |
|---|---|---|---|---|---|---|---|
| LEFT-SIDE (I-1)TH FRAME | CENTRAL COORDINATES | 16, 5 | 7, 6 | 26, 5 | 16, 13 | 7, 14 | 16, 14 |
| | SIZE | 32 | 32 | 32 | 32 | 32 | 32 |
| | THRESHOLD VALUE | 1 | 1 | 1 | 1 | 1 | 1 |

FIG.8B
FINAL DETECTION RESULT AND CONTENTS TO BE RECORDED IN FEATURE HISTORY RECORDING UNIT OF CURRENT FRAME, AND ITS DIFFERENCE FROM PREVIOUS FRAME

| | ID | B | A | C | E | D | F |
|---|---|---|---|---|---|---|---|
| LEFT-SIDE I-TH FRAME | CENTRAL COORDINATES | 17, 6 | 8, 7 | 27, 6 | 17, 15 | 8, 18 | 27, 16 |
| | SIZE | 32 | 32 | 32 | 32 | 32 | 32 |
| | THRESHOLD VALUE | 1 | 1 | 1 | 1 | 1 | 1 |

| | DIFFERENCE | 1.4 | 1.4 | 1.4 | 1.4 | 1.4 | 1.4 |
|---|---|---|---|---|---|---|---|

FIG.8C
CONTENTS TRANSMITTED TO TRANSMISSION UNIT

| | ID | B | A | C | E | D | F |
|---|---|---|---|---|---|---|---|
| LEFT-SIDE I-TH FRAME | CENTRAL COORDINATES | 17, 6 | 8, 7 | 27, 6 | 17, 15 | 8, 18 | 27, 16 |
| | SIZE | 32 | 32 | 32 | 32 | 32 | 32 |
| | THRESHOLD VALUE | 1 | 1 | 1 | 1 | 1 | 1 |

FIG.9

| FRAME 1 | ID | B | A | C | E | D | F |
|---|---|---|---|---|---|---|---|
| | CENTRAL COORDINATES | 18, 7 | 9, 8 | 28, 8 | 16, 13 | 7, 14 | 26, 14 |
| | SIZE | 32 | 20 | 32 | 20 | 32 | 20 |
| | THRESHOLD VALUE | 1 | 2 | 1 | 2 | 1 | 2 |
| FRAME 2 | ID | B | A | C | E | D | F |
| | CENTRAL COORDINATES | 17, 6 | 8, 7 | 27, 7 | 15, 12 | 6, 13 | 25, 13 |
| | SIZE | 32 | 20 | 32 | 20 | 32 | 20 |
| | THRESHOLD VALUE | 1 | 2 | 1 | 2 | 1 | 2 |
| FRAME 3 | ID | B | A | C | E | D | F |
| | CENTRAL COORDINATES | 16, 5 | 7, 6 | 26, 6 | 14, 11 | 5, 12 | 14, 12 |
| | SIZE | 32 | 20 | 32 | 20 | 32 | 20 |
| | THRESHOLD VALUE | 1 | 2 | 1 | 2 | 1 | 2 |
| FRAME 4 | ID | A | C | E | D | F | |
| | CENTRAL COORDINATES | 8, 7 | 27, 7 | 15, 12 | 8, 15 | 25, 13 | |
| | SIZE | 20 | 32 | 20 | 32 | 20 | |
| | THRESHOLD VALUE | 2 | 1 | 2 | 1 | 2 | |
| FRAME 5 | ID | B | A | C | E | D | F |
| | CENTRAL COORDINATES | 18, 7 | 8, 7 | 28, 8 | 16, 13 | 6, 13 | 16, 14 |
| | SIZE | 32 | 20 | 32 | 20 | 32 | 20 |
| | THRESHOLD VALUE | 1 | 2 | 1 | 2 | 1 | 2 |
| FRAME 6 | ID | B | A | C | E | D | F |
| | CENTRAL COORDINATES | 18, 7 | 8, 6 | 28, 8 | 16, 14 | 6, 13 | 16, 15 |
| | SIZE | 32 | 20 | 32 | 20 | 32 | 20 |
| | THRESHOLD VALUE | 1 | 2 | 1 | 2 | 1 | 2 |

FIG.10A

INDIVIDUAL MARKER INFORMATION

| CURRENT FRAME | B |
|---|---|
| CENTRAL COORDINATES | 17, 7 |
| SIZE | 32 |
| THRESHOLD VALUE | 1 |

COMPARISON RESULT

| | NUMBER OF MATCHING MARKERS |
|---|---|
| FRAME 1 | 1 |
| FRAME 2 | 1 |
| FRAME 3 | 0 |
| FRAME 4 | 0 |
| FRAME 5 | 1 |
| FRAME 6 | 1 |

FIG.10B

INDIVIDUAL MARKER INFORMATION

| CURRENT FRAME | A |
|---|---|
| CENTRAL COORDINATES | 7, 6 |
| SIZE | 20 |
| THRESHOLD VALUE | 2 |

COMPARISON RESULT

| | NUMBER OF MATCHING MARKERS |
|---|---|
| FRAME 1 | 1 |
| FRAME 2 | 2 |
| FRAME 3 | 1 |
| FRAME 4 | 1 |
| FRAME 5 | 2 |
| FRAME 6 | 2 |

FIG.10C

INDIVIDUAL MARKER INFORMATION

| CURRENT FRAME | C |
|---|---|
| CENTRAL COORDINATES | 28, 8 |
| SIZE | 32 |
| THRESHOLD VALUE | 1 |

COMPARISON RESULT

| | NUMBER OF MATCHING MARKERS |
|---|---|
| FRAME 1 | 2 |
| FRAME 2 | 2 |
| FRAME 3 | 1 |
| FRAME 4 | 1 |
| FRAME 5 | 3 |
| FRAME 6 | 3 |

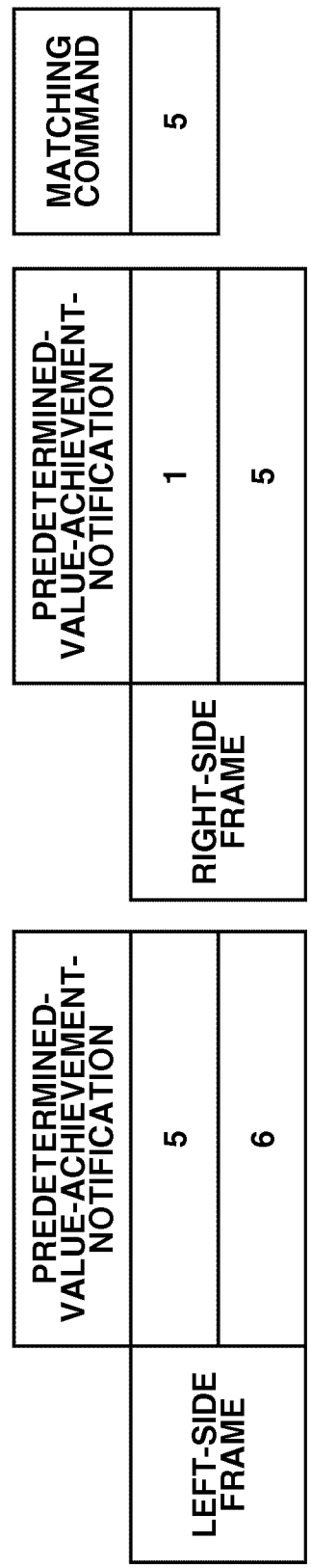

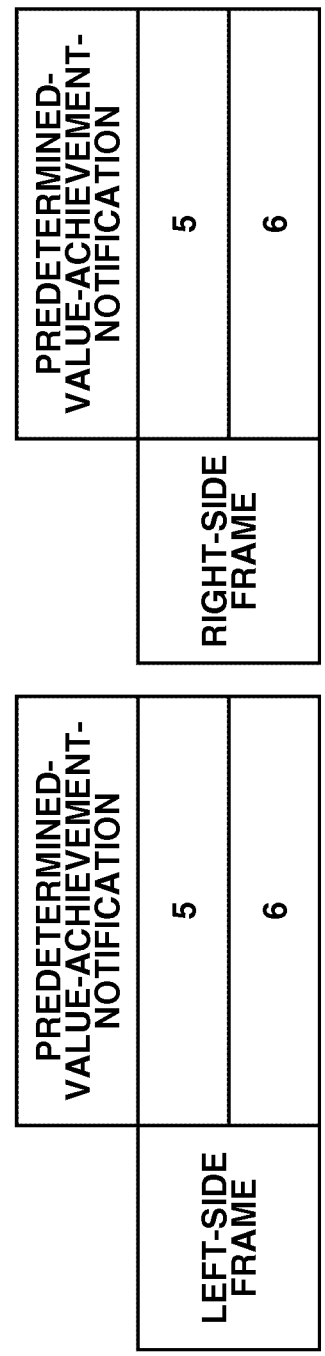

FIG.20A

| FRAME 1 | ID | B | A | C | E | D | F |
|---|---|---|---|---|---|---|---|
| | CENTRAL COORDINATES | 18, 7 | 9, 8 | 28, 8 | 16, 13 | 7, 14 | 26, 14 |
| FRAME 2 | ID | B | A | C | E | D | F |
| | CENTRAL COORDINATES | 17, 6 | 8, 7 | 27, 7 | 15, 12 | 6, 13 | 25, 13 |
| FRAME 3 | ID | B | A | E | D | | |
| | CENTRAL COORDINATES | 26, 5 | 17, 6 | 24, 11 | 15, 12 | | |

FIG.20B

| CURRENT FRAME | B |
|---|---|
| CENTRAL COORDINATES | 27, 6 |
| SIZE | 20 |
| THRESHOLD VALUE | 2 |

FIG.20C

| FRAME 3 | ID | B | A | E | D |
|---|---|---|---|---|---|
| | CENTRAL COORDINATES | 26, 5 | 17, 6 | 24, 11 | 15, 12 |

# IMAGE PROCESSING APPARATUS, IMAGE PROCESSING METHOD THEREOF, AND COMPUTER-READABLE STORAGE MEDIUM

BACKGROUND OF THE INVENTION

1. Field of the Invention

The present invention relates to an image processing apparatus, an image processing method, and a computer-readable storage medium that can detect a feature in a plurality of consecutive images.

2. Description of the Related Art

In recent years, mixed reality (MR) technology has been known as a technology for seamlessly mixing a real world and a virtual world in real time. One kind of this MR technology is to provide a mixed reality image to a user with a video see-through head mounted display (HMD) or a handheld video display apparatus (handheld device (HHD)).

The video see-through HMD used for realizing the MR technology images an object that substantially matches an object observed from the position of eyes of the user by, for example, a video camera. The video see-through HMD provides a mixed reality space by displaying a captured image with computer graphics (CG) superimposed thereon to the user.

A technology of measuring the position and orientation of an HMD by detecting a feature point in a captured image, and arranging a virtual object at an appropriate position, to thereby superimpose CG on the captured image is known. Generally, the processing of detecting a feature point in a captured image produces a large processing load, and therefore it is required to effectively reduce the processing load even if only slightly. Reducing the processing load leads to a reduction in the power consumption as well, so that the operable time of the HMD can be increased if it is powered by a battery.

One method to reduce the processing load in the processing of detecting a feature point in a captured image is a method of comparing a feature point in a current frame with the result of detection of a feature point in an immediately preceding frame. The method discussed in Japanese Patent Application Laid-Open No. 2006-331108 performs a stereo measurement in two captured moving images positioned on an epipolar line. This Japanese patent application discusses that, in this method, the result of an immediately preceding frame is inherited to limit a target region in a current frame, if a feature point in one of the images captured by the two cameras is within the range of a predetermined value from the result of the immediately preceding frame.

In the method discussed in Japanese Patent Application Laid-Open No. 2006-331108 it is difficult to apply image processing to the left side and the right side independently, since this method is based on a stereo measurement, which requires detection of matching points in both the left and right captured images and confirmation whether they actually match each other by comparing them. Therefore, this method cannot provide sufficiently accurate processing when the HMD is in an inclined state, and cannot accomplish efficiency easily, so that this method is not suitable to an MR system.

SUMMARY OF THE INVENTION

The present invention is directed to a technology for independently and efficiently detecting a feature point in a plurality of input images, comparing each detected feature with a previous result, and inheriting the previous result with accuracy, thereby reducing a processing load.

According to an aspect of the present invention, an image processing apparatus includes a detection unit configured to sequentially detect a plurality of features in a frame of an image, an acquisition unit configured to sequentially acquire information of the plurality of detected features, and a determination unit configured to compare information of a feature detected in a current frame of the image with the information of a previous feature detected in a previous frame stored in a storage unit, and to sequentially determine whether each detected feature of the current frame matches a corresponding previous feature stored in the storage unit, wherein the determination unit is configured to stop the determination and to set the information of the plurality of features detected in the previous frame as information of the plurality of features detected in the current frame, in a case where there is determined to be a predetermined number of matches between previous features and corresponding current features.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates marker information stored in a feature history recording unit.

FIGS. 6A, 6B, and 6C illustrate an example of setting the result of a current frame so as to become the same as the previous frame.

FIGS. 8A, 8B, and 8C illustrate an example in which the difference between the result of the immediately preceding frame and the result of the current frame exceeds a threshold value.

FIG. 9 illustrates a plurality of pieces of previous marker information recorded in the feature history recording unit.

FIGS. 10A, 10B, and 10C illustrate comparisons with the plurality of previous frames.

FIG. 11 illustrates a condition for outputting a matching command from the plurality of previous frames by a control unit.

FIG. 12 illustrates a condition for outputting a matching command from the plurality of previous frames by the control unit.

FIGS. 20A, 20B, and 20C illustrate a change in comparison target frames according to the second modification.

DESCRIPTION OF THE EMBODIMENTS

Various exemplary embodiments, features, and aspects of the invention will be described in detail below with reference to the drawings.

The exemplary embodiments, which will be described below, detect a marker which is a set of feature points.

Figure 1:
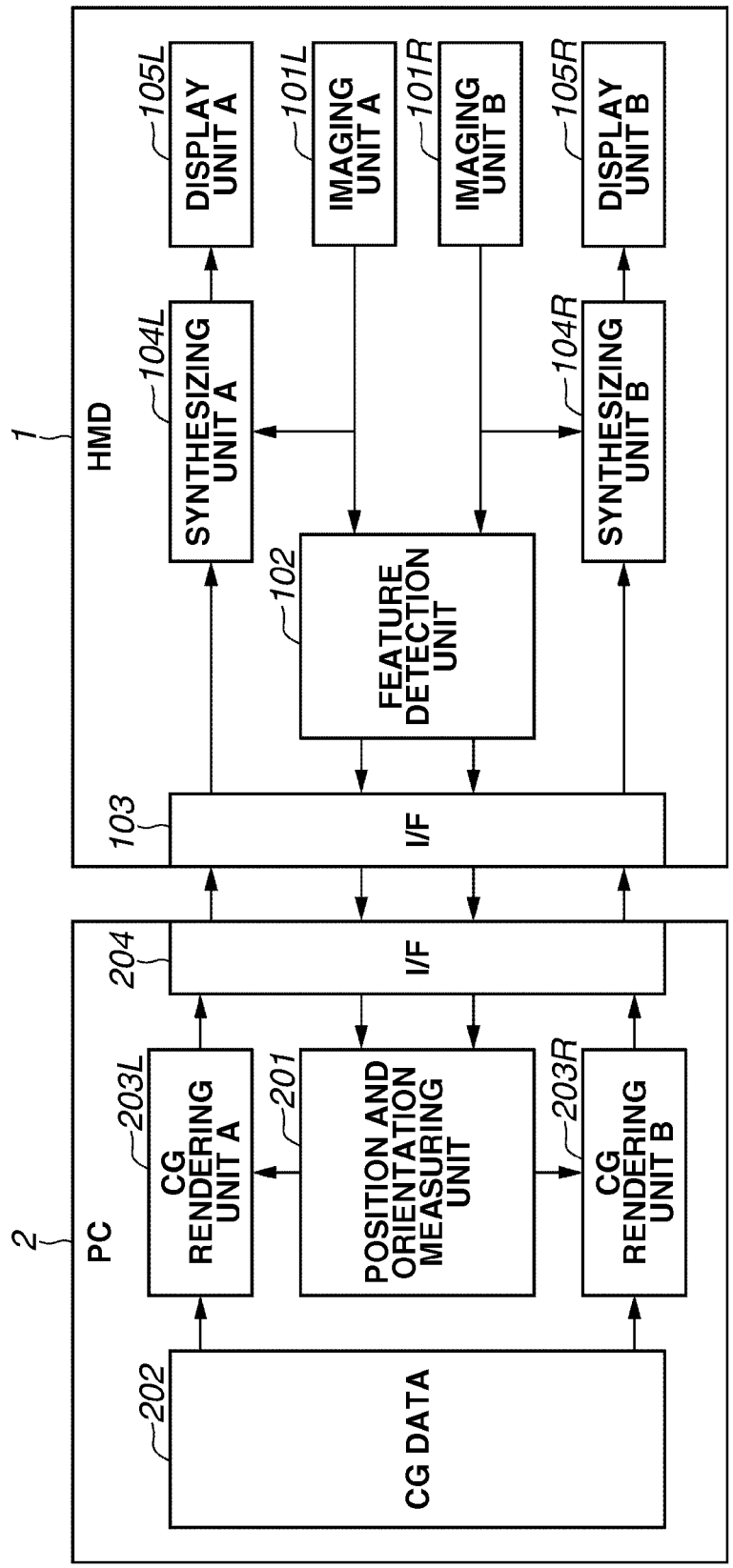
FIG. 1 is a block diagram of a system according to a first exemplary embodiment of the present invention.

FIG. 1 is a block diagram of a system according to a first exemplary embodiment of the present invention. This system is configured to provide a mixed reality to a user.

A video see-through HMD 1 can function to separately process images to be supplied to the left eye and the right eye of a user. In FIG. 1, units that provide the same function for a left eye side and a right eye side are indicated by letters L and R, respectively, in such a manner that L is affixed to a unit for the left eye side while R is affixed to a unit for the right eye side. In the description below, processing for the left eye side will be described, and the same processing is also performed for the right eye side, unless otherwise indicated.

An imaging unit (A) 101L and an imaging unit (B) 101R stereoscopically capture images (a first image and a second image), respectively. A feature detection unit 102 extracts a marker from the image captured by the imaging unit 101L. Information of this marker is transmitted to a position and orientation measuring unit 201 of a personal computer (PC) 2 via interfaces (I/Fs) 103 and 204. The position and orientation measuring unit 201 measures the position and orientation of the HMD 1 based on the marker information. A CG rendering unit 203L renders CG with use of information of the position and orientation measured by the position and orientation measuring unit 201 and CG data 202. The rendered CG is transmitted to a synthesizing unit 104L via the I/Fs (204 and 103). The synthesizing unit 104L synthesizes the rendered CG and the image captured by the imaging unit 101L to display the synthesized image on a display unit 105L, thereby providing a mixed reality to the user.

According to this configuration, the user can experience a mixed reality world, in which the real world and the virtual world are seamlessly mixed in real time, by wearing the video see-through HMD 1.

Figure 2:
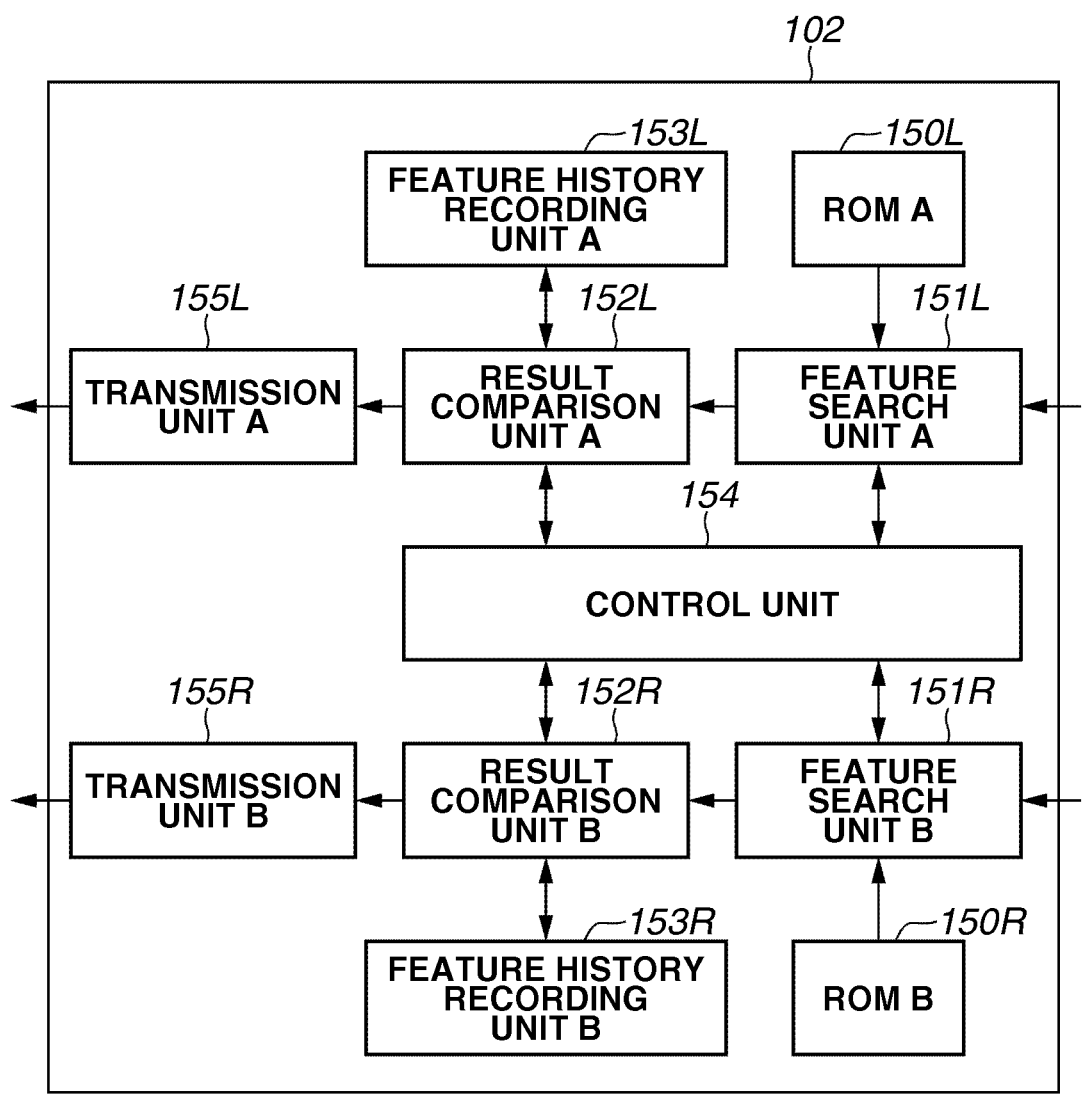
FIG. 2 is a detailed block diagram of a feature detection unit according to the first exemplary embodiment.

FIG. 2 is an internal block diagram of the feature detection unit 102.

A feature search unit 151L detects a marker in an input image signal. The relationship between a size of the marker and a threshold value is recorded in a read only memory (ROM) 150L. The feature search unit 151L generates individual marker information from the information of the size, central coordinates, and identification (ID) of the marker detected by the feature search unit 151L, and threshold value information recorded in the ROM 150L, and transmits the generated individual marker information to a result comparison unit 152L.

A feature history recording unit 153L records marker information organized into groups, each of which contains detected individual marker information of one previous frame (first recording). Hereinafter, the term "marker information" will be used to refer to such group of individual marker information of one frame. The result comparison unit 152L refers to the feature history recording unit 153L, or the marker information is stored in the feature history recording unit 153L after a comparison result.

The result comparison unit 152L compares the individual marker information received from the feature search unit 151L with previous individual marker information recorded in the feature history recording unit 153L. Further, the result comparison unit 152L rewrites data stored in the feature history recording unit 153L (second recording) based on the determination according to the comparison result. Moreover, the result comparison unit 152L determines the marker information (feature point information) of the current frame, and transmits the marker information to a transmission unit 155L.

A control unit 154 monitors and controls the processing for the left and right sides.

The transmission unit 155L transmits the marker information of the current frame received from the result comparison unit 152L to the I/F 103.

In this way, the main processing of the feature detection unit 102 is detecting a marker in a current frame, and comparing this result with a previous search result to determine the marker information of the current frame. These two kinds of processing will be described in detail.

Figures 3A, 3B, 3C:
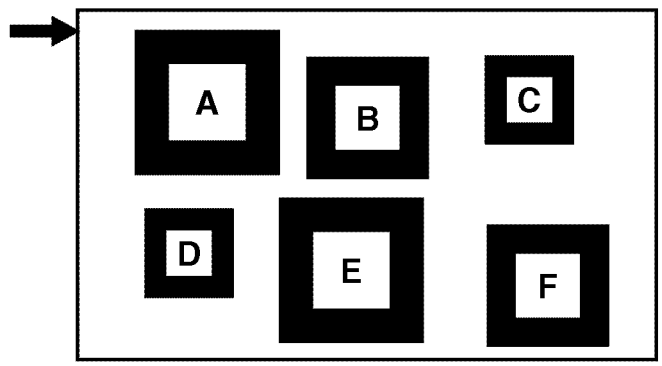
FIGS. 3A, 3B, and 3C illustrate an input image and individual marker information of a first marker.

A marker detection is performed by the feature search unit 151L. FIGS. 3A, 3B, and 3C illustrate this processing.

FIG. 3A illustrates an image input from the imaging unit 101L, in which the feature search unit 151L performs the marker detection for each line. All of the squares A to F illustrated in FIG. 3A are markers.

FIG. 3B illustrates individual marker information of the marker A acquired as a result of the marker detection applied to the input image illustrated in FIG. 3A. The result illustrated in FIG. 3B includes an ID, central coordinates, a size, and the like, but the individual marker information is not limited to the contents illustrated in FIG. 3B. The individual marker information may include at least coordinates of a feature point. If the size of the feature point is definable, it is desirable to record the size as well, and therefore the present exemplary embodiment is configured to record the size. The threshold value indicated in FIG. 3B is a value varying depending on the size of a marker, and is recorded in the ROM 150L. This threshold value is a maximum value of a difference based on which it is determined whether a marker in a current frame matches the marker detection result of a previous frame when they are compared with each other.

FIG. 3C illustrates an example of the threshold value. In the present exemplary embodiment, as illustrated in FIG. 3C, as an object is larger, the threshold value is smaller. However, the threshold value is not limited thereto, and may be defined in any manner according to an intended use. The present exemplary embodiment has been designed in consideration of a case requiring accuracy in the vicinity of a marker, and therefore employs the definition of the threshold as illustrated in FIG. 3C. The individual marker information detected by the feature search unit 151L is sequentially transmitted to the result comparison unit 152L.

The feature search unit 151L ends the detection processing in the current frame, when the feature search unit 151L receives a matching command, which will be described below, from the control unit 154, or completes the detection in one frame.

Next, the comparison processing of the result comparison unit 152L will be described in detail. The present exemplary embodiment stops the marker detection processing, where the feature search unit 151L is currently performing (so interrupts the marker detection processing being performed by the feature search unit), and determines that the previous marker information matches the marker information of the current frame, when the central coordinates of three or more pieces of individual marker information match the previous marker information within the threshold values at both the left side and the right side.

The number of individual marker information pieces that should match the previous marker information within the threshold values is not limited to three. The marker detection processing is stopped when the number of matches exceeds a predetermined number M, which is a positive integer. Preferably M is equal to or greater than 2. More preferably M is equal to or greater than 3. The result comparison unit 152L compares the marker detection result from the feature search unit 151L with the information in the feature history recording unit 153L. FIG. 5 illustrates an example of the structure stored in the feature history recording unit 153L.

Figures 4A, 4B:
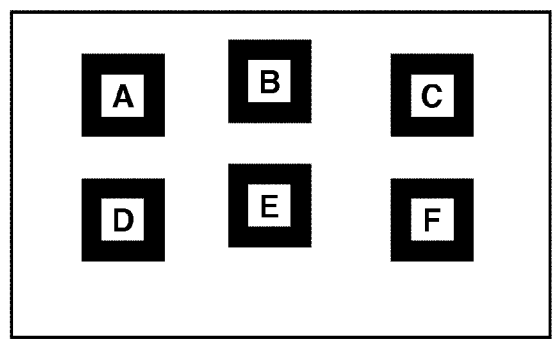
FIGS. 4A and 4B illustrate an input image of an immediately preceding frame, and recorded marker information thereof.

FIG. 5 illustrates the marker information detected by the feature search unit 151L when an input image is the image illustrated in FIG. 4A having the information indicated in FIG. 4B. The marker information is not arranged in alphabetical order, because the markers are arranged in the order of the detection of the markers and the marker detection is performed from the top for each horizontal line. The information illustrated in FIG. 5 is marker information of one frame, but the feature history recording unit 153L can store results of a plurality of frames.

The processing of comparing the individual marker information of a current frame with the marker information of an immediately preceding frame will be described with reference to FIGS. 6A, 6B, and 6C. FIGS. 6A, 6B, and 6C illustrate an example of a comparison applied to an input image supplied to the left eye of the user, which is an example when there are three or more matches of individual marker information.

FIG. 6A is the marker information of the immediately preceding frame that has been already registered in the feature history recording unit 153L. The result comparison unit 152L determines whether the difference between the central coordinates of the received individual marker information and the central coordinates of the individual marker information in the marker information stored in the feature history recording unit 153L is equal to or smaller than the threshold value (a first determination). It should be noted that the comparison is made only between markers which are predicted to have the same ID based on the detected order number of the marker. The present exemplary embodiment employs a distance as a difference between central coordinates, but may employ a vector as this difference. Further, the present exemplary embodiment uses the threshold value of the individual marker information of a current frame as a threshold value. However, since the information regarding the threshold value is also recorded as individual marker information of the immediately preceding frame, either of the threshold values may be used as a threshold value.

FIG. 6B illustrates an example when third individual marker information is detected in the current frame, and an example indicating distance differences between the individual marker information of the current frame and the individual marker information of the immediately preceding frame. Referring to the differences indicated in FIG. 6B, the marker IDs, B, A, and C have the differences within the respective threshold values from the individual marker information of the immediately preceding frame. The present exemplary embodiment stops the marker detection processing, where the feature search unit 151L is currently performing (so interrupts the marker detection processing being performed by the feature search unit), when the central coordinates of three or more pieces of individual marker information are within the respective threshold values from the previous marker information at both the left side and the right side.

The result comparison unit 152L notifies the control unit 154 that the above-described condition is satisfied at one side, when the result of FIG. 6B is detected. This notification will be referred to as "predetermined-value-achievement-notification". When the control unit 154 receives the predetermined-value-achievement-notification for the current frame from each of the left and right result comparison units 152L and 152R, the control unit 154 issues a matching command to the left and right result comparison units 152L and 152R, and the feature search units 151L and 151R. In other words, the matching command is a command to stop the marker detection processing being currently performed since there are M or more matches within the threshold values at both the left and right sides, and to determine that the previous maker information is the same as the marker information of the current frame.

Upon receiving the matching command from the control unit 154, the result comparison unit 152L ends the comparison processing, and determines that the marker information of the current frame is the same as the marker information of the immediately preceding frame. The result comparison unit 152L transmits the determined marker information of the current frame to the transmission unit 155L.

In the example illustrated in FIGS. 6A, 6B, and 6C, since three or more pieces of individual marker information illustrated in FIG. 6B are within the ranges of the threshold values from the individual marker information pieces of the immediately preceding frame illustrated in FIG. 6A, the marker information of the current frame is set to the marker information illustrated in FIG. 6C which is the same as the marker information illustrated in FIG. 6A, and the individual marker information illustrated in FIG. 6B is discarded. The marker information illustrated in FIG. 6C is transmitted to the transmission unit 155L. At this time, the marker information illustrated in FIG. 6C is not recorded in the feature history recording unit 153L, and no change is made between the contents of the feature history recording unit 153L before and after this comparison processing (so at this stage no change is made to the contents of the feature history recording unit).

Figures 7A, 7B:
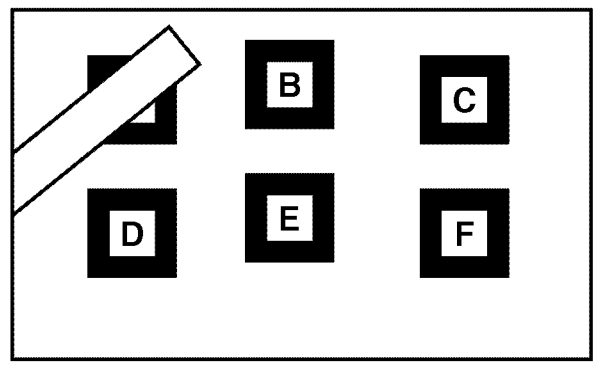
FIGS. 7A and 7B illustrate an example when a part of a marker is hidden.

FIG. 7A illustrates an example of a frame with the marker A hidden by something in the real world such as a hand or an object. FIG. 7B illustrates a result of detection of three markers in the input image signal illustrated in FIG. 7A, and differences of the three markers compared with the markers illustrated in FIG. 6A. In this case, since three or more pieces of individual marker information match the marker information illustrated in FIG. 6A within the threshold values, as in the case with the example without an obstacle in a frame, the marker information illustrated in FIG. 6C is transmitted to the transmission unit 155L as the marker information of the current frame.

FIGS. 8A, 8B, and 8C illustrate an example when less than three pieces of individual marker information match the marker information of a previous frame within the threshold values. FIG. 8A illustrates the marker information of an immediately preceding frame. FIG. 8B illustrates an example of detection of all pieces of individual marker information of a current frame, and an example of distance differences between the individual marker information pieces of the current frame and the individual marker information pieces of the immediately preceding frame. Referring to the differences illustrated in FIG. 8B, less than three pieces of individual marker information of the current frame match the individual marker information of the immediately preceding frame within the respective threshold values. Therefore, the marker information of the current frame is set to the information illustrated in FIG. 8C. This marker information illustrated in FIG. 8C is stored in the feature history recording unit 153L, and is transmitted to the transmission unit 155L as a result of the current frame.

A current frame is compared with the result of the immediately preceding frame in this way.

Next, an example of comparing a current frame with previous N frames (N is a positive integer) will be described.

The feature history recording unit 153L stores a plurality of pieces of marker information to enable a comparison with a plurality of previous frames, as illustrated in FIG. 9. In the following, the description will be given assuming that there are six frames as a plurality of previous frames by way of example, but generally, the number of previous frames is not limited to six.

Upon acquiring the individual marker information from the feature search unit 151L, the result comparison unit 152L refers to the feature history recording unit 153L, and determines whether the acquired individual marker information matches the individual marker information pieces in all pieces of marker information stored in the feature history recording unit 153L. This comparison method will be described with reference to FIG. 9 and FIGS. 10A, 10B, and 10C.

As illustrated in FIG. 9, there are the marker information pieces of previous six frames recorded in the feature history recording unit 153L.

Then, FIG. 10A illustrates a comparison result when the individual marker information illustrated in FIG. 10A is compared with the marker information pieces illustrated in FIG. 9, which are recorded in the feature history recording unit 153L. Similarly, the result comparison unit 152L makes a comparison as illustrated in FIGS. 10B and 10C each time the result comparison unit 152L receives individual marker information from the feature search unit 151L.

In the comparison result illustrated in FIG. 10C, there are two frames satisfying the condition that three or more pieces of individual marker information should match the marker information of a previous frame within the respective threshold values. The result comparison unit 152L notifies the control unit 154 of the predetermined-value-achievement-notification and the frame numbers of the previous frames that satisfy the condition. Upon receiving the predetermined-value-achievement-notifications having the same frame number from both the left and right sides, the control unit 154 outputs a matching command together with the matching frame number to the result comparison units 152L and 152R, and the feature search units 151L and 151R.

FIG. 11 illustrates an example when the control unit 154 receives the predetermined-value-achievement-notification of the frames 5 and 6 from the result comparison unit 152L, and also receives the predetermined-value-achievement-notification of the frames 1 and 5 from the result comparison unit 152R. In the example illustrated in FIG. 11, since 5 is the common frame number shared by the received predetermined-value-achievement-notifications from the left side and the right side, the control unit 154 transmits a matching command and the frame number 5 to the result comparison units 152L and 152R, and the feature search units 151L and 151R. The result comparison units 152L and 152R determine that the marker information of the current frame is (corresponds to) the marker information of the frame 5 for the respective left and right sides.

FIG. 12 illustrates an example when there is a plurality of frame numbers as common frame numbers shared by the left side and the right side. The present exemplary embodiment adopts the data of the frame 6, since the data is arranged so that the largest frame number implies the latest data. Alternatively, the result comparison units 152L and 152R may transmit the differences from the previous frames together with the predetermined-value-achievement-notification, so that the control unit 154 can select a frame having the least physical difference between the current frame and the previous frame.

If the result comparison unit 152L does not receive a matching command from the control unit 154 but receives a search end signal, which will be described later, from the feature search unit 151L, the marker information of the current frame is determined in the same manner as the determination at the time of the comparison with the immediately preceding frame. The determined result is transmitted to the transmission unit 155L, and is overwritten on the oldest information in the feature history recording unit 153L. The result may be overwritten based on weighting of the previous frames according to use frequency, instead of being overwritten on the oldest information.

The comparison with results of a plurality of previous frames is performed in this way.

The processing flow of the feature search unit 151L according to the present exemplary embodiment will be described with reference to the flowchart of FIG. 13. The processing illustrated in the flowchart of FIG. 13 starts when the feature search unit 151L receives one frame of an input image signal from the imaging unit 101L.

In step S201, the feature search unit 151L sets a horizontal line for use in a marker search.

In step S202, the feature search unit 151L determines whether there is a matching command from the control unit 154. If the feature search unit 151L receives the matching command (YES in step S202), the feature search unit 151L ends the search processing. If the feature search unit 151L does not receive a matching command (NO in step S202), in step S203, the feature search unit 151L performs marker detection.

In step S203, the feature search unit 151L performs marker detection along the horizontal line set in step S201. If the feature search unit 151L detects a marker on the set line (YES in step S203), in step S204, the feature search unit 151L transmits the individual marker information to the result comparison unit 152L. If the feature search unit 151L does not detect a marker (NO in step S203), the processing proceeds to step S205.

In step S204, the feature search unit 151L transmits the individual marker information detected in step S203 to the result comparison unit 152L, and then the processing proceeds to step S202. At this time, since the feature search unit 151L does not reset the search line, the feature search unit 151L can detect all markers even if there are one or more markers on a single line.

In step S205, the feature search unit 151L determines whether the current search line is the final line in the input image signal. If the current search line is not the final line (NO in step S205), the processing proceeds to step S201, in which the feature search unit 151L sets the next line. If the current search line is the final line (YES in step S205), the feature search unit 151L transmits a signal indicating an arrival at the final line to the result comparison unit 152L, and then ends the search processing.

Next, the processing flow of the result comparison unit 152L according to the present exemplary embodiment will be described with reference to the flowchart of FIG. 14. The processing illustrated in flowchart of FIG. 14 also starts when the feature search unit 151L receives one frame of an input image signal.

In step S251, the result comparison unit 152L confirms whether there is a matching command from the control unit 154. If the result comparison unit 152L receives the matching command from the control unit 154 (YES in step S251), the processing proceeds to step S261. If the result comparison unit 152L does not receive a matching command from the control unit 154 (NO in step S251), the processing proceeds to step S252.

In step S261, the result comparison unit 152L sets the marker information corresponding to the previous frame number received together with the matching command obtained from the feature history recording unit 153L as a result of the current frame, and then the processing proceeds to step S263.

In step S252, the result comparison unit 152L confirms whether the result comparison unit 152L receives a signal indicating an arrival of marker detection at the final line from the feature detection unit 151L. If the marker detection is ended (YES in step S252), the processing proceeds to step S262.

In step S262, the result comparison unit 152L adopts the result temporarily recorded in step S260 as marker information of the current frame. The result comparison unit 152L stores the adopted marker information in the feature history recording unit 153L. Then, the processing proceeds to step S263.

In step S253, the result comparison unit 152L determines whether it receives individual marker information from the feature search unit 151L. If the result comparison unit 152L does not receive individual marker information (NO in step S253), the result comparison unit 152L is set in a waiting state, and the processing returns to step S251. If the result comparison unit 152L receives individual marker information (YES in step S253), the processing proceeds to step S254 in which the result comparison unit 152L performs the comparison processing.

Steps S254 to S259 are repeatedly performed to all of the previous frames stored in the feature history recording unit 153L.

In step S255, the result comparison unit 152L determines whether the central coordinates of the received individual marker information match the central coordinates of the marker information of the previous frame within the threshold value (the first determination). If they match each other (YES in step S255), the processing proceeds to step S256.

In step S256, the result comparison unit 152L increments the matching number of the matching frame by one. Then, the processing proceeds to step S257.

In step S257, the result comparison unit 152L determines whether the matching number is three or more (a second determination). If the matching number is three or more (YES in step S257), the processing proceeds to step S258.

In step S258, the result comparison unit 152L transmits the predetermined-value-achievement-notification and the frame number to the control unit 154.

In step S260, after the above-described processing is applied to all of the previous frames, the result comparison unit 152L temporarily records the received individual marker information. Then, the processing returns to the step S251.

In step S263, the result comparison unit 152L transmits the determined marker information of the current frame to the transmission unit 155L.

According to the above-described processing, the present exemplary embodiment detects a feature independently in a plurality of input image signals, respectively, and compares such features with the results of previous frames, respectively, thereby realizing the utilization of the results of previous frames while maintaining the accuracy. For example, in a case where a marker is searched for in an image captured by a monocular camera, even if a predetermined number of markers are detected at the same positions as a previous result, there is still a high possibility of detection of different markers, leading to insufficiency for practical use. The present exemplary embodiment, which captures a stereo image, i.e., two images of the same position, utilizes the existence of a slight difference between the viewpoint positions thereof to search for a marker in both left and right (or top and bottom) images of the stereo image. Therefore, even if the marker detection is stopped when a predetermined number of markers are detected to be located at the same positions as a previous result, the present exemplary embodiment is sufficiently reliable to make a determination that they are actually located at the same positions, thereby realizing an apparatus capable of reducing a load from the feature detection.

Figure 15:
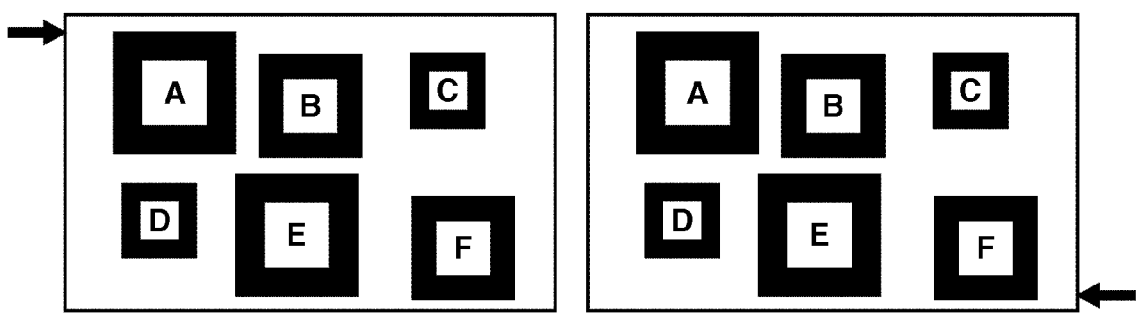
FIG. 15 illustrates a marker search order according to a first modification of the present invention.

A first modification of the exemplary embodiment of the present invention utilizes the ability to detect a feature independently in a plurality of captured images to detect a feature in left and right captured images in different scanning orders as illustrated in FIG. 15. In other words, the present modification scans the right image in an opposite direction (a reverse direction) from the direction (a forward direction) in which the left image is scanned. Preferably the search line of the left image, which extends across the width of the image, starts at the top of the image and moves downward. Preferably the search line of the right image, which extends across the width of the image starts at the bottom of the image and moves upward. This method makes detection of a large change made at apart of an image more easily, for example, in such a case that there is no change around the starting point of scanning but there is a change in the vicinity of the ending position of the scanning.

Figure 16:
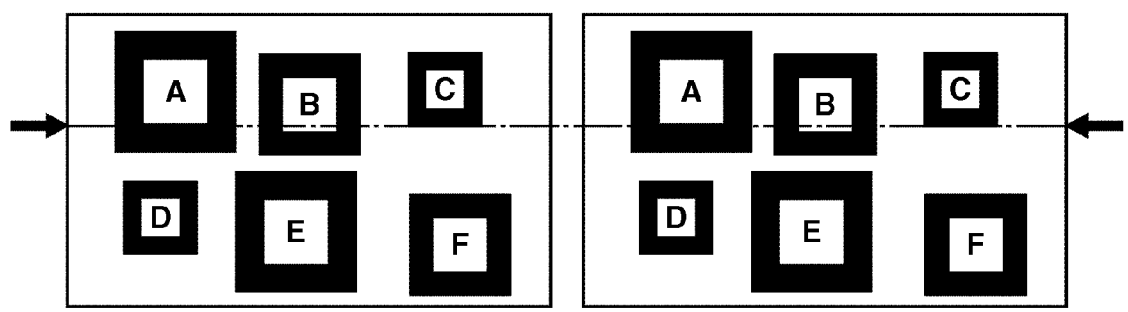
FIG. 16 illustrates a condition for ending the marker search according to the first modification.

The MR technology using a video see-through HMD can measure the position and orientation of the HMD with use of the position and orientation measuring unit 201 by detecting a marker in only one of left and right images. Therefore, it is enough to perform marker detection in a region corresponding to an entire region in a screen as the union of a scanned region at the left side and a scanned region at the right side. Therefore, as illustrated in FIG. 16, it is possible to equally divide the processing load between the left and right sides by setting the end condition in such a manner that detection is ended when a total scanned region of the left and right sides corresponds to an entire screen.

The present modification will be described based on an example of stopping the detection when there are six or more matches within the threshold values as a total of the left side and the right side. However, the detection may be stopped based on another number of matches within the threshold values, instead of being stopped based on six matches.

The processing of the present modification will be now described. In the following description, the processing of the feature search unit and the processing of the result comparison unit will be described as the processing at the left eye side, but the same processing is also performed at the right eye side.

Figure 17:
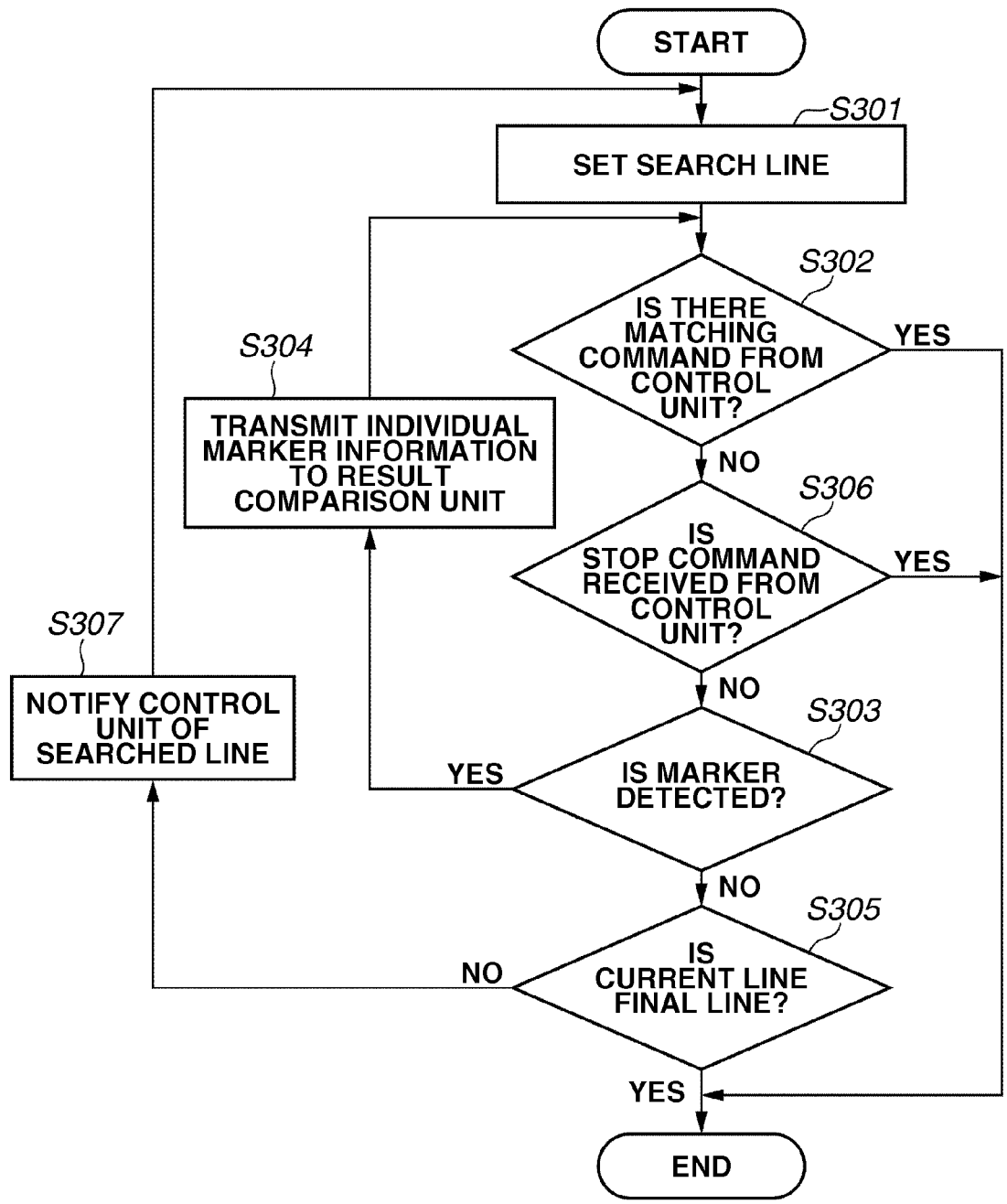
FIG. 17 is a flowchart of a feature search unit according to the first modification.

FIG. 17 is a flowchart of the feature search unit 151L according to the present modification.

Figure 13:
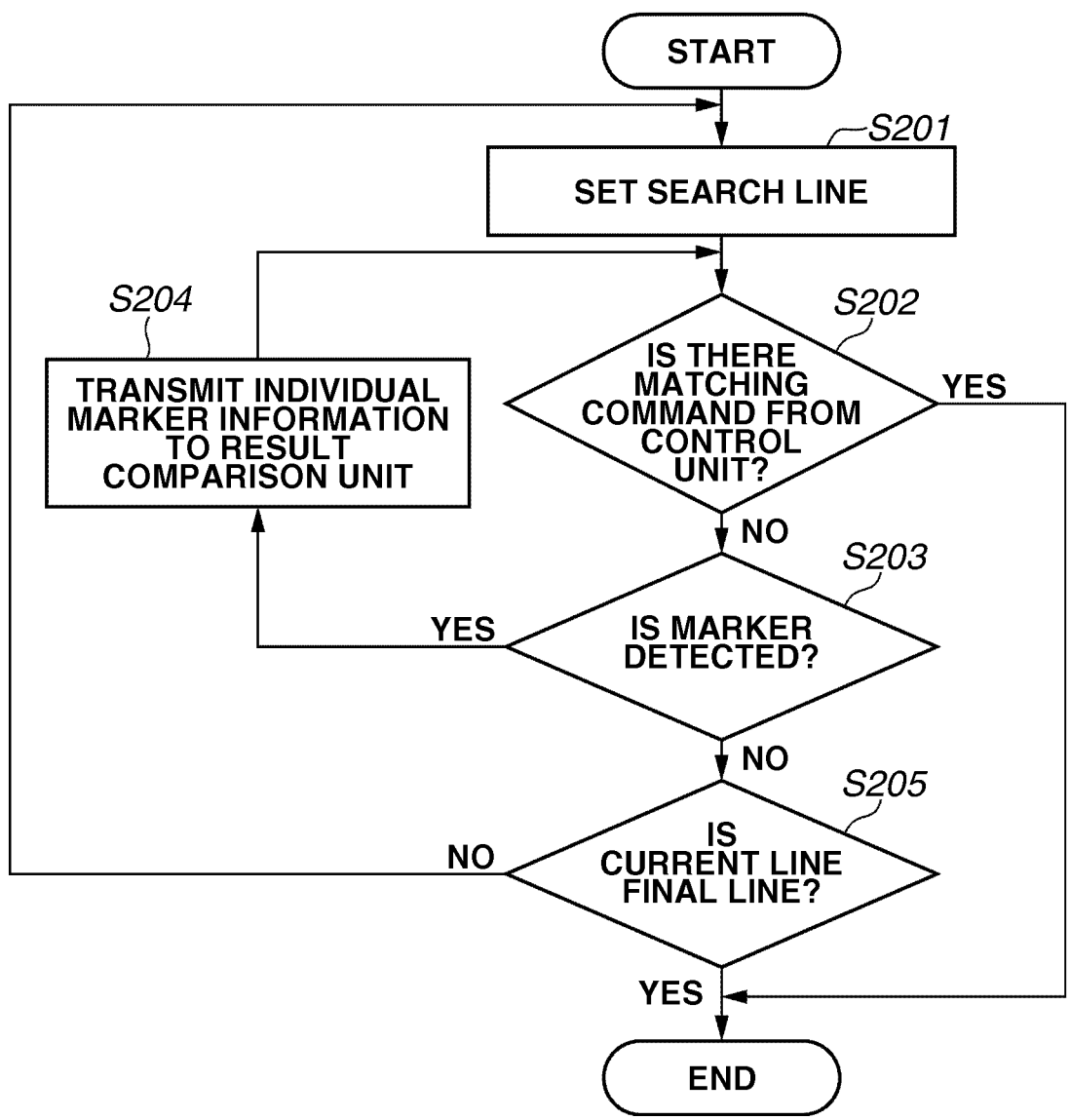
FIG. 13 is a flowchart of a feature search unit according to the first exemplary embodiment.

The functions of steps S301 to S305 are similar to steps S201 to S205 illustrated in FIG. 13, as mentioned in the description of the first exemplary embodiment.

The present modification performs marker detection in a left captured image and a right captured image indifferent scanning directions, and ends the marker detection when the combination of the scanned regions of the left and right sides corresponds to an entire screen, even when the scanning has not yet reached the final line. Therefore, in step S307, each time the feature search unit 151L finishes marker detection on one line, the feature search unit 151L notifies the control unit 154 of the finished region.

The control unit 154 monitors the regions where the feature detection units 151L and 151R finish marker detection, and outputs a stop command to the feature search units 151L and 151R and the result comparison units 152L and 152R when the control unit 154 detects all regions.

In step S306, the feature search unit 151L confirms whether there is a stop command. If there is the stop command (YES in step S306), the feature search unit 151L ends the detection processing. In the present modification, the detection line is arranged so that there is no overlap generated between the left and right sides, but there may be an overlap of the detection line between the left and right sides.

Figure 18:
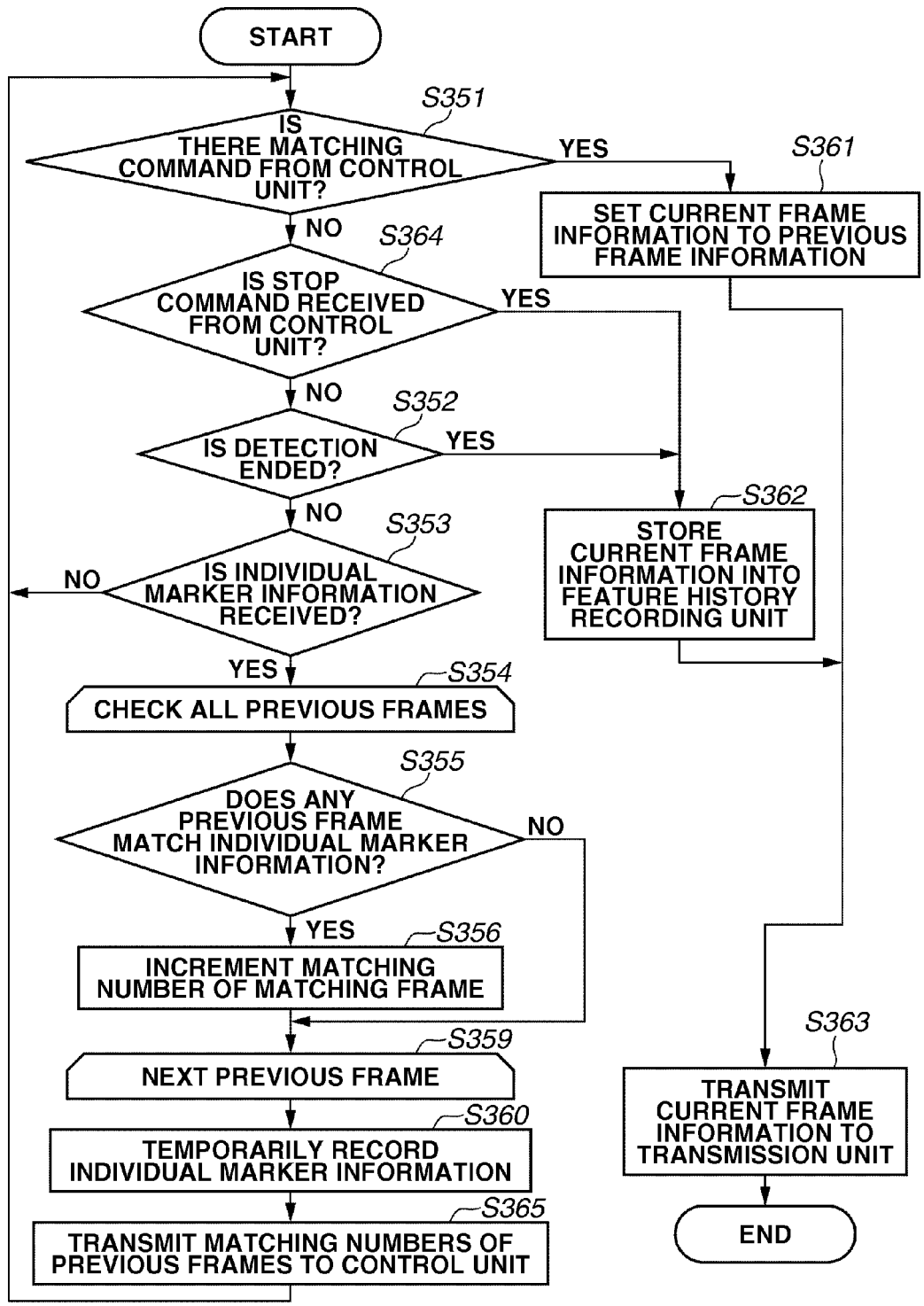
FIG. 18 is a flowchart of a result comparison unit according to the first modification.

FIG. 18 is a flowchart of the result comparison unit 152L according to the present modification.

Figure 14:
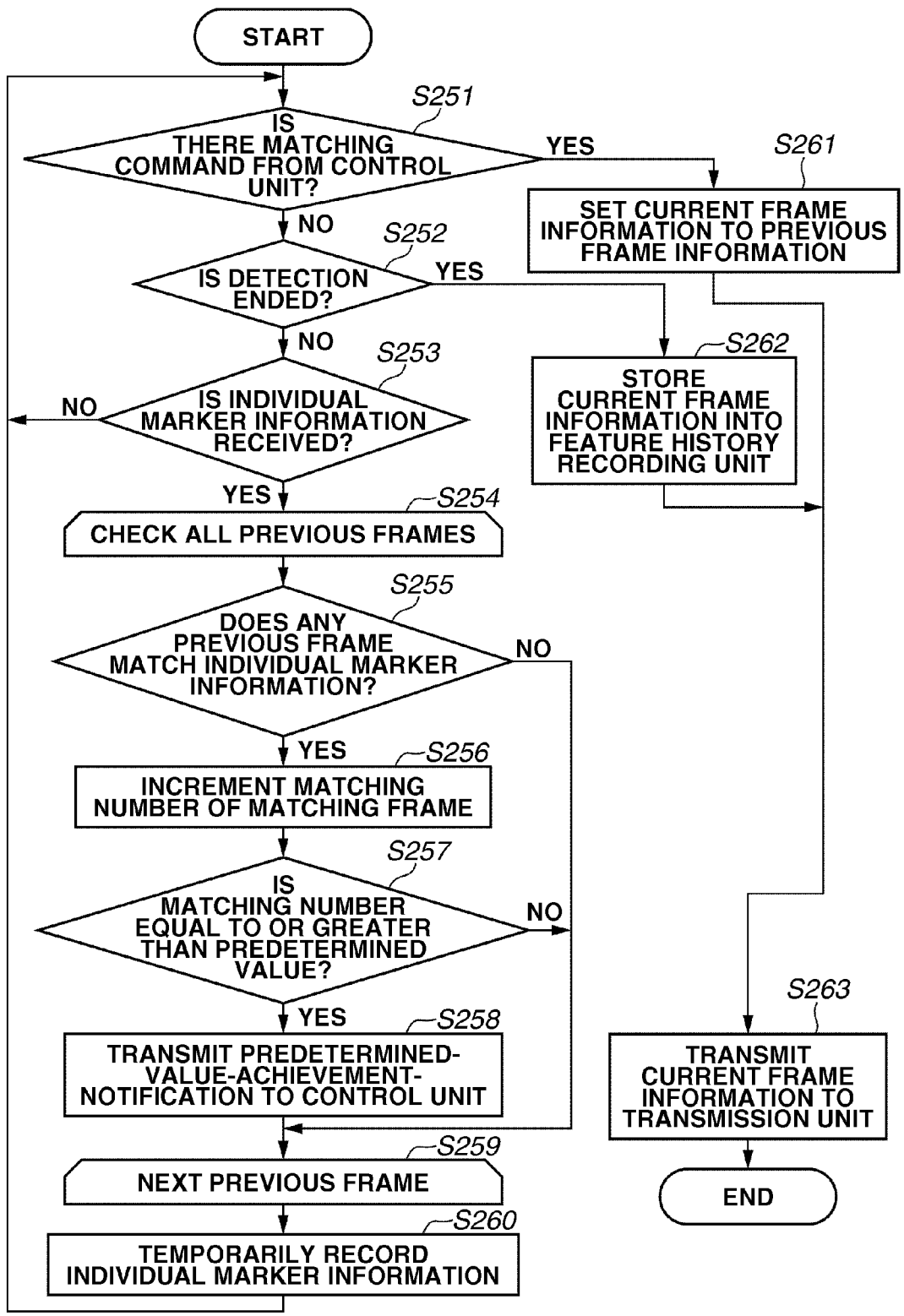
FIG. 14 is a flowchart of a result comparison unit according to the first exemplary embodiment.

The functions of steps S351 to S356 and S359 to S363 are similar to steps S251 to S256 and S259 to S263 illustrated in FIG. 14, as mentioned in the description of the first exemplary embodiment.

In step S364, the result comparison unit 152L confirms whether a stop command is received from the control unit 154. If the stop command is received from the control unit 154 (YES in step S364), the processing proceeds to step S362, in which the result comparison unit 152L determines the result of the current frame by adopting the result temporarily recorded in step S360 as marker information of the current frame, and stores the determined result in the feature history recording unit 153L.

In step S365, the result comparison unit 152L transmits the matching numbers with the respective previous frames to the control unit 154 after finishing comparing the individual marker information with the respective previous frames.

The control unit 154 monitors the matching numbers transmitted from the result comparison units 152L and 152R, and transmits a matching command to the result comparison units 152L and 152R and the feature detection units 151L and 151R when the total of the matching numbers is six or more.

According to this processing, executing the marker detection for the left side and the right side independently enables a comparison with use of a wide reality space and the utilization of the results of previous frames while maintaining the accuracy, thereby leading to the accomplishment of an apparatus capable of reducing a load from the feature detection.

Figure 19A:
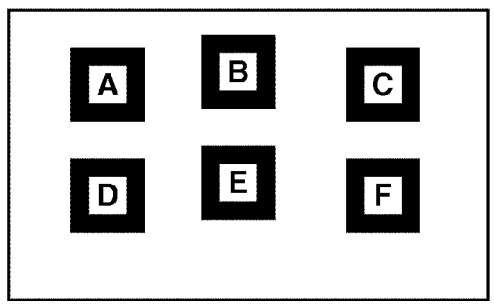
FIGS. 19A and 19B illustrate an example of an improvement according to a second modification of the present invention compared to the first exemplary embodiment.
Figure 19B:
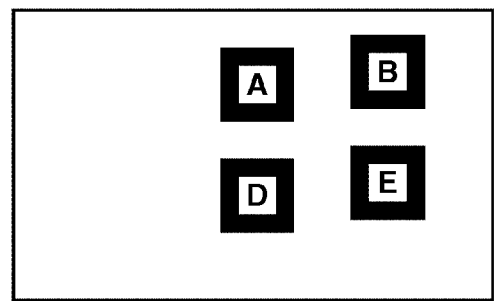

In a second modification of the exemplary embodiment of the present invention, if the difference between a previous frame A and a current frame B is larger than a threshold value as illustrated in FIGS. 19A and 19B, this previous frame is removed from the comparison targets, thereby realizing the efficiency of the processing. This method will be now described.

The present modification uses the same value for a threshold value for removing a previous frame from the comparison targets as the threshold value for use in a comparison between the central coordinates of the previous marker information and the individual marker information, as described in the first exemplary embodiment. However, this does not limit the present modification, and the present modification may make a comparison with use of an additional new value as a threshold value for use in a removal of a previous frame from the comparison targets. In the following description, the processing for the left eye side will be described, but the same processing is also performed for the right eye side, unless otherwise indicated.

FIG. 20A illustrates an example of the marker information of the previous frames recorded in the feature history recording unit 153L. In this example, the comparison processing is performed in the same manner as the first exemplary embodiment, when the feature search unit 151L transmits the individual marker information illustrated in FIG. 20B to the result comparison unit 152L.

The result comparison unit 152L can determine that the individual marker information for B in the current frame, as shown in FIG. 20B, differs by more than the threshold from the individual marker information for B in the frames 1 and 2 illustrated in FIG. 20A by comparing the individual marker information pieces of the corresponding IDs. The result comparison unit 152L removes the frames 1 and 2, which are determined to be beyond the range of the threshold value, from the comparison targets with the current frame. After that, the result comparison unit 152L compares the individual marker information received from the feature search unit 151L only with the frame 3 illustrated in FIG. 20C.

Figure 21:
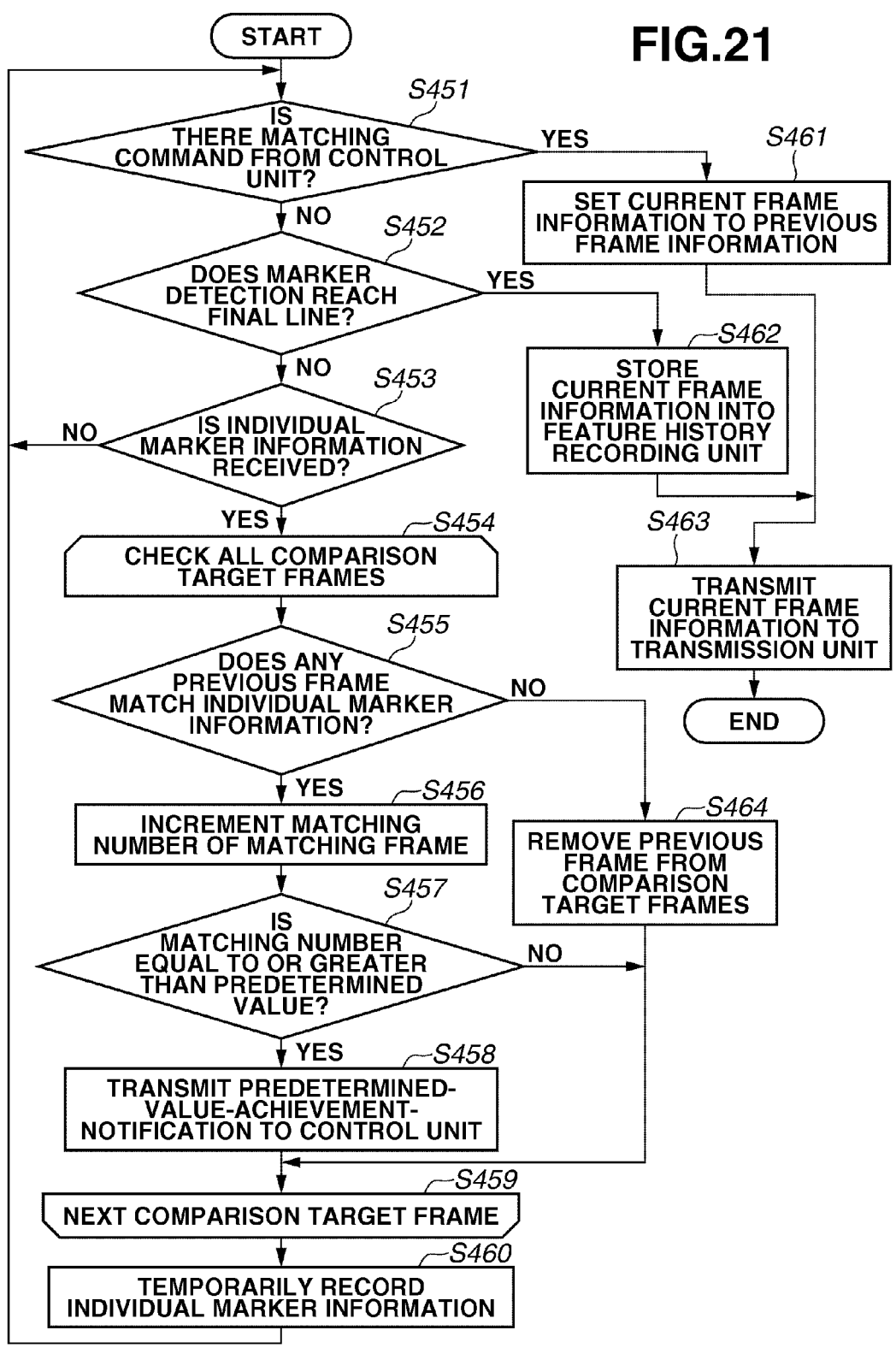
FIG. 21 is a flowchart of a result comparison unit according to the second modification.

FIG. 21 is a flowchart of the result comparison unit 152L according to the present modification.

The functions of steps S451 to S463 illustrated in FIG. 21 are similar to steps S251 to S263 illustrated in FIG. 13, as mentioned in the description of the first exemplary embodiment.

In step S455, the result comparison unit 152L compares the individual marker information with a previous frame. If the difference therebetween is larger than the threshold value (NO in step S455), the processing proceeds to step S464. In step S464, the result comparison unit 152L removes the previous frame determined to be beyond the range of the threshold value in step S455 from the comparison targets with the current frame.

According to this processing, detecting respective feature independently in a plurality of input image signals and effectively comparing such features with the previous frame results, respectively, can achieve an apparatus capable of reducing a load from the feature detection.

Having described specific exemplary embodiments, a feature used as a search target may be any feature point, and the feature detection can be applied to an object that is not a marker in the above-described exemplary embodiments. For example, a feature may be a natural feature.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

This application claims priority from Japanese Patent Application No. 2010-279892 filed Dec. 15, 2010, which is hereby incorporated by reference herein in its entirety.

What is claimed is:

1. An image processing apparatus comprising:
a search line setting unit configured to set a search line for detecting a feature in a first stereoscopic image and a second stereoscopic image captured by an imaging apparatus;
a detection unit configured to sequentially detect a plurality of features in a frame of the images along the set search line;
an acquisition unit configured to sequentially acquire information of the plurality of detected features;
a comparison unit configured to compare information of a feature detected in a current frame of the image with the information stored in a storage unit, of a previous feature detected in a previous frame;
a determination unit configured to determine whether each detected feature of the current frame matches a corresponding previous feature stored in the storage unit based on a result of the comparison unit; and
a setting unit configured to set information of the corresponding previous feature detected in the previous frame as information of the feature detected in the current frame in a case where there is determined to be a predetermined number of matches between previous features and corresponding current features, wherein the detection unit is configured to move the search line in the first stereoscopic image in a first direction to sequentially detect a plurality of features in the first stereoscopic image, and the detection unit is further configured to move the search line in a second direction, opposite to the first direction, to sequentially detect a feature in the second stereoscopic image.

2. The image processing apparatus according to claim 1, wherein the detection unit is configured to stop detection by the detection unit in the case where there is determined to be the predetermined number of matches between previous features and corresponding current features.

3. The image processing apparatus according to claim 1, wherein the acquisition unit is configured to sequentially acquire information including a size of each detected feature and the storage unit is configured to store information including a size of each previous feature, and
wherein the determination unit is configured to determine whether a match is made on the basis of a comparison between the size of a previous feature, obtained from the storage unit, and the size of a current feature acquired by the acquisition unit.

4. The image processing apparatus according to claim 1, wherein the information acquired by the acquisition unit includes an image position of each detected feature and the information stored in the storage unit includes an image position of each previous feature, and
wherein the determination unit is configured to determine whether a match is made on the basis of a comparison between an image position of a previous feature, obtained from the storage unit, and an image position of a current feature, acquired by the acquisition unit.

5. The image processing apparatus according to claim 1, wherein the information acquired by the acquisition unit includes a size and an image position of each detected feature and the information stored in the storage unit includes a size and an image position of each previous feature, and
wherein the determination unit is configured to determine whether a match is made on the basis of a comparison between a size and an image position of a previous feature, obtained from the storage unit, and a size and an image position of a current feature, acquired by the acquisition unit.

6. The image processing apparatus according to claim 4, wherein the determination unit is configured to determine that the previous feature matches the current feature, in a case where a difference between the image position of the previous feature and the image position of the current feature is less than a predetermined threshold value.

7. The image processing apparatus according to claim 6, wherein the threshold value is set in accordance with a size of the feature.

8. The image processing apparatus according to claim 1, wherein the feature is a marker or a natural feature.

9. The image processing apparatus according to claim 1, wherein the detection unit is configured to detect a region corresponding to an entire region of a screen of the image as a combination of the respective detected regions in the first and second stereoscopic images.

10. The image processing apparatus according to claim 1, wherein the storage unit is configured to store, for each of a plurality of previously detected frames, information of the features detected in the respective previously detected frames, and the determination unit is configured to sequentially compare information of the features of the current frame with information of the features of each previously detected frame, and
wherein, in a case where there is determined to be a predetermined number of matches between previous features and corresponding current features of a particular previous frame, the determination unit is configured to stop the determination and to set the information of the features of the particular previous frame as information of the features detected in the current frame.

11. The image processing apparatus according to claim 1, wherein the determination unit is configured to remove the information of the features of a specific previous frame as a comparison target in the case where the information of a feature in the specific previous frame differs by more than a predetermined value from the information of the corresponding feature in the current frame.

12. An image processing method performed by a computer, comprising:
setting a search line for detecting a feature in a first stereoscopic image and a second stereoscopic image captured by an imaging apparatus;
sequentially detecting a plurality of features in a frame of the images along the set search line;
acquiring information of the detected plurality of features;
comparing information of a previous feature, from information of the plurality of features detected in a previous frame of the image, with the information of the detected current feature;
determining whether the previous feature matches the current feature, and
setting information of the corresponding previous feature detected in the previous frame as information of the feature detected in the current frame in a case where there is a predetermined number of matches between previous features and corresponding current features,
wherein the detecting step, moving the search line in a first stereoscopic image in a first direction to sequentially detect a plurality of features in the first stereoscopic image, and the detection unit is further configured to moving the search line in a second direction, opposite to the first direction, to sequentially detect a feature in the second stereoscopic image.

13. A non-transitory computer-readable storage medium on which is recorded a program for causing a computer to execute the image processing method according to claim 12.

14. The apparatus according to claim 1, wherein the setting unit is configured to stop the detection process in a case where there is determined to be a predetermined number of matches between previous features and corresponding current features.

15. The apparatus according to claim 1, wherein the imaging apparatus is a head mount display.

16. The apparatus according to claim 2, further comprising:
a calculation unit configured to calculate position and orientation of the imaging apparatus based on the set information of the feature detected in the current frame.

* * * * *